United States Patent [19]
O'Connell et al.

[11] 3,800,443
[45] Apr. 2, 1974

[54] READING ACCELERATOR

[76] Inventors: Gertrude S. O'Connell; William H. O'Connell, both of Lakeview Dr., RFD 1, North Salem, N.Y. 10560

[22] Filed: May 4, 1973

[21] Appl. No.: 357,255

[52] U.S. Cl.................... 35/35 H, 46/43, 273/86 D
[51] Int. Cl. .......................................... G09b 17/00
[58] Field of Search...... 35/35 R, 35 H, 22 R, 22 A; 273/86 C, 86 D; 46/43

[56] References Cited
UNITED STATES PATENTS

| | | | |
|---|---|---|---|
| 1,628,903 | 5/1927 | Northrop | 46/43 UX |
| 2,729,914 | 1/1956 | Cook | 46/43 |
| 2,752,727 | 7/1956 | Cotton | 46/43 |
| 3,075,770 | 1/1963 | Young | 46/43 X |
| 3,379,440 | 4/1968 | Jaffe | 273/86 C |
| 3,672,074 | 6/1972 | Huffstetter | 35/35 H |
| 2,863,603 | 12/1958 | Doupnik | 35/23 R UX |

FOREIGN PATENTS OR APPLICATIONS

| | | | |
|---|---|---|---|
| 341,120 | 7/1904 | France | 46/43 |
| 142,479 | 1/1930 | Switzerland | 46/43 |

*Primary Examiner*—Wm. H. Grieb
*Attorney, Agent, or Firm*—Howson & Howson, Richard D. Weber

[57] ABSTRACT

A teaching aid for training students to read from left to right which includes a substantially vertically disposed panel which presents to the view of the student a parallel array of horizontal slots. A captive ball within the slot is advanced by the student's finger from the left-hand end of the uppermost slot toward the right. On reaching the right-hand end of each slot, the ball descends along a hidden ramp to the left-hand end of the succeeding slot. Means are preferably provided to impede the rolling of the ball along the slot so that the student's finger must traverse substantially the length of each slot, always moving to the right. Indicia such as words or letters may be provided on the panel along each slot so that the student's eyes will become acclimated to the correct direction of eye travel when reading individual words and lines of words.

11 Claims, 7 Drawing Figures

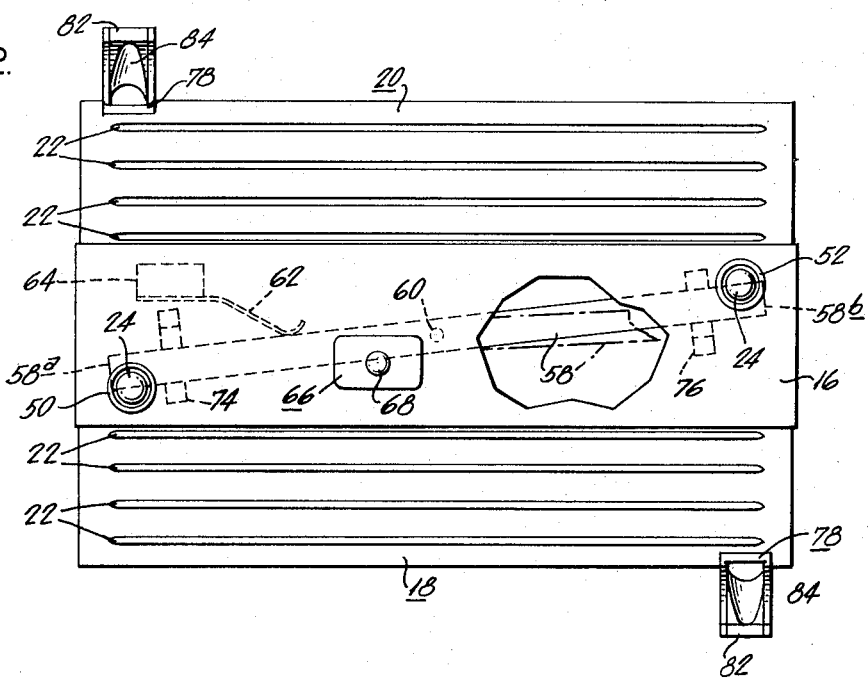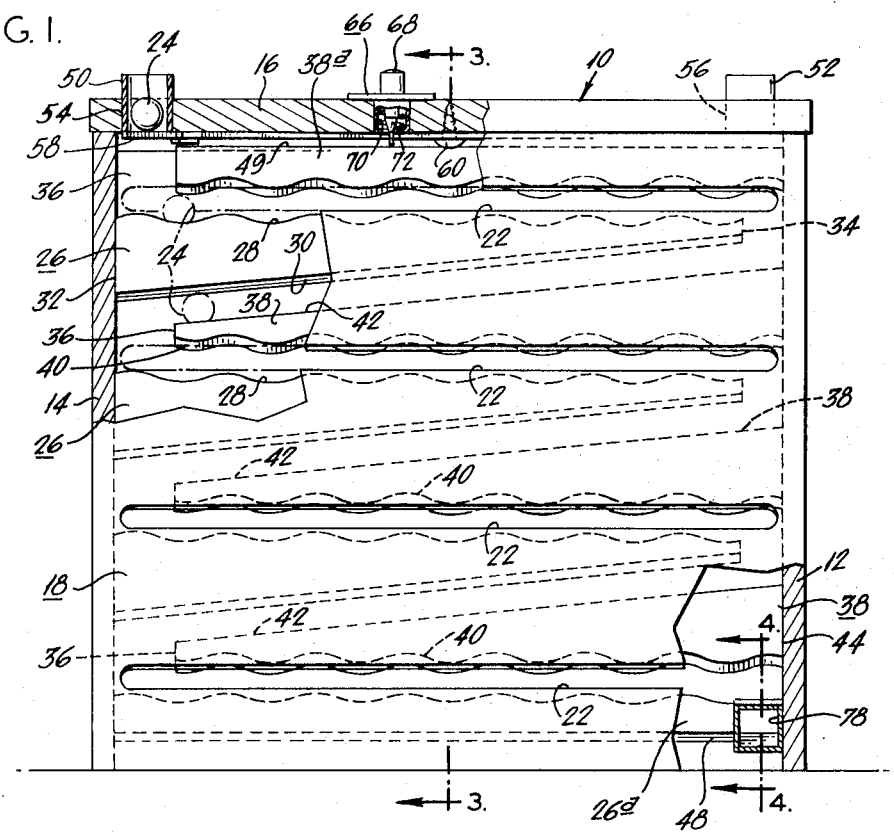

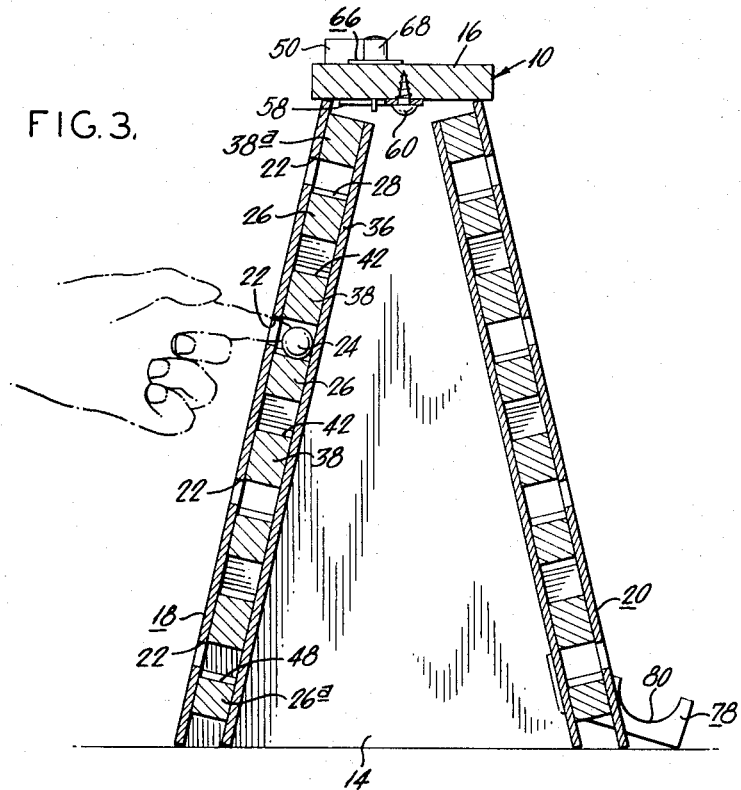
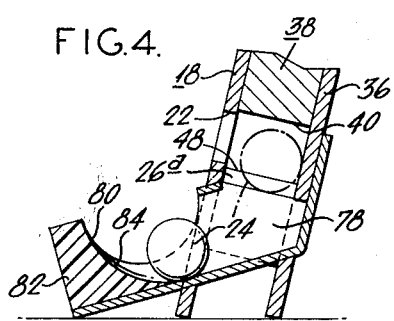
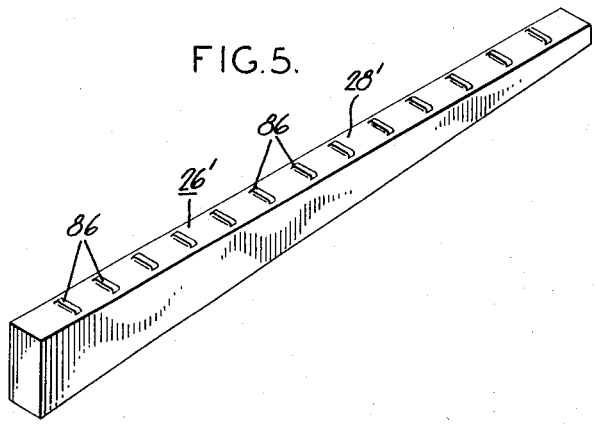
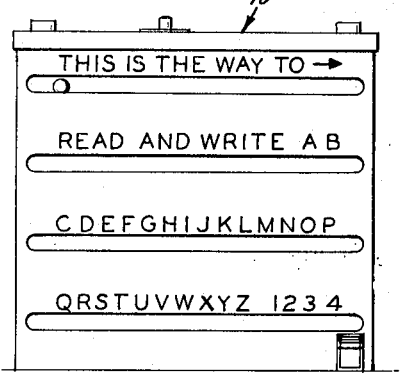
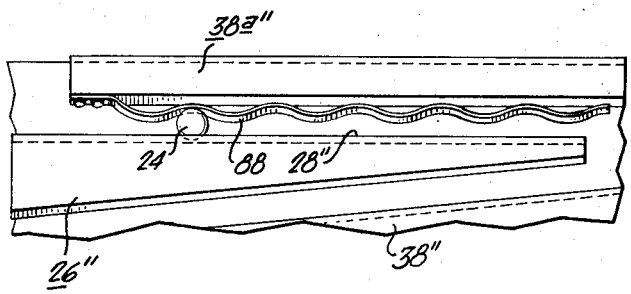

READING ACCELERATOR

The present invention relates generally to teaching aids for students learning to read and relates more particularly to such a device for aiding students who have difficulty in sensing the concept of reading letters and words from left to right.

A surprisingly large number of children and in fact many adults have difficulty in orienting their visual perception faculties in the manner necessary to read words and sentences in the sequence in which they are written in most languages, namely, from left to right. This handicap to achieving satisfactory reading speed and comprehension can be overcome with remedial training. Remedial classes are established in many schools in an effort to overcome this serious handicap which affects the student's ability to proceed with a regular course of education.

Attempts have in the past been made to develop a teaching aid which will train the student's eyes to follow the path normally traveled during reading. One such device is that disclosed in U. S. Pat. No. 3,672,074 issued on June 27, 1972. In this device, the student inserts a pointer having a ball end into a slot in a panel and advances the pointer along the slot, following a path which is intended to approximate the path of the eyes when reading printed material. The slot includes a succession of horizontal portions which are linked by diagonal portions joining the right-hand end of one slot to the left-hand end of the slot below. Upon reaching the right-hand end of the lowermost slot, the pointer may be removed.

Although the concept of the device shown in U.S. Pat. No. 3,672,074 is in certain respects related to that of the present invention, there is a serious shortcoming of the patented device which the present invention has overcome. In the patented device, the pointer must be manipulated from the right-hand end of one line leftwardly back to the beginning of the following line, thus largely negating the sensory impression gained by the rightwardly traverse of the pointer along the preceeding line. Since the return track of the patented device is in sight at all times, and since a positive manipulative step is required of the student in traversing the pointer along this track, the student would devote as much attention to left-hand movements as to right-hand movements and the net gain at the end of the exercise would be minimal. It is believed that the operation of the device of the patent would be lacking in interest to the student inasmuch as the pointer movement is at all times within the control of the student and there are no cause and effect functions carried out by the device which might aid in retaining the student's interest in the training program. It is further believed that the student would become quickly bored with the concept of inserting a pointer at one point in a panel and removing it from another point after a succession of zig-zag hand controlled movements.

In the present invention, a panel is provided having a plurality of horizontal slots within which a captive ball is advanced by the student's finger. The ball movement is begun at the left-hand end of the upper slot and the ball can only be withdrawn on reaching the right-hand end of the lowermost slot. Upon movement of the ball by the student to the right-hand end of each slot, the ball disappears from sight and travels down a hidden ramp to the left-hand end of the slot below. The student successively advances the ball rightwardly across each slot until the lowermost slot has been traversed, at which point the ball is released. Means are preferably provided to limit the rolling tendency of the ball and thus require a full traverse of each slot by the student's hand.

An important advantage of the invention is the arrangement whereby the student's hand movement traverses the slots only in a right-hand direction, the left-hand movement of the ball being completely hidden from view and requiring no manipulative step on the part of the student. Accordingly, the student will become acclimated to an eye movement from left to right which simulates the eye movement required for reading. Indicia such as letters or words may be placed along the slots to be read in conjunction with the ball movement.

It is accordingly a first object of the present invention to provide a teaching device for training students to read from left to right.

A further object of this invention is to provide a teaching device as described which requires the continuous attention of the student in the performance of a series of rightwardly directed movements which simulate the path of focus of the eyes in reading printed material.

A further object of the invention is to provide a teaching device as described which incorporates a captive movable object which disappears from view at the end of a given path of travel and which reappears into view at the beginning of a successive path of travel at a point horizontally remote from the point of disappearance, thereby adding an element of mystery to the operation of the device which holds the student's interest.

Another object of the invention is to provide a teaching device as described which is adapted, when employed in pairs, for use as a game wherein students compete in a speed contest to determine who can complete the task first.

Still another object of the invention is to provide a teaching device as described which can be inexpensively manufactured.

Further objects and advantages of the invention will be more readily apparent from the following detailed description of embodiments thereof when taken together with the accompanying drawings wherein:

FIG. 1 is a side elevational view of a teaching device embodying the present invention, said device being adapted for simultaneous use by two students sitting on opposite sides thereof;

FIG. 2 is a plan view of the device shown in FIG. 1 with a portion thereof broken away to show details of the ball starting mechanism;

FIG. 3 is a sectional view taken along line 3—3 of FIG. 1 and illustrating the manner in which a student advances a ball along one of the horizontal ball tracks;

FIG. 4 is an enlarged partial sectional view showing the manner in which a ball is discharged from the device;

FIG. 5 is a perspective view showing a modified form of the horizontal ball track wherein means are included for impeding the rolling tendency of a ball;

FIG. 6 is a partial elevational view of a further modified form of the invention showing alternate means for restricting the rolling tendency of the ball; and FIG. 7 is an elevational view of a device embodying the present invention which includes words and letters above the ball slots to acclimate the student's eyes to the proper reading motion.

Referring to the drawings and specifically FIGS. 1–3 thereof, a reading accelerator generally designated 10 in accordance with the present invention includes an upstanding support structure comprising tapered vertical end panels 12 and 14 and a horizontal top member 16 extending between and secured to the end panels. Inwardly sloping side panels 18 and 20 extend between the end panels and each include a plurality of spaced parallel horizontal slots 22. The slots extend substantially the full width of the side panels and are of a width sufficient to allow the insertion thereinto and the freely slidable movement therealong of a student's finger.

Track means are provided behind each side panel to support and guide a ball 24 which is of a larger diameter than the slots 22. In the illustrated device, which is designed for simultaneous use by two students, two identical balls 24 are employed, one for each panel 18. In the embodiment of FIGS. 1–3, the track means comprises a track element 26 having a thickness slightly larger than the diameter of the ball which is disposed below and behind each slot 22 of the side panels. As shown in FIG. 1, each of the track elements 26 comprises a generally triangular shaped member having a wave shaped track surface 28 along its upper edge and a straight diagonally extending lower edge 30. Each track element is disposed with its track surface slightly below the bottom edge of the associated slot 22 and with its left-hand edge 32 abutting the left-hand end panel. The right-hand end 34 of the track element terminates short of the right-hand end panel a distance somewhat larger than the diameter of the ball 24. A backer sheet 36 is secured against the track elements of each side panel and extends substantially the full height and width of the corresponding side panel.

Ball guides 38 alternately disposed between the track elements 26 and being identical in shape thereto although in an inverted disposition are characterized by a wave-form ball guide surface 40 comprising the bottom edge thereof, and an inclined upper surface 42 sloping downwardly to the left which serves, as will be discussed below, as the track surface for guiding the ball from the right-hand end of one slot to the left-hand end of the succeeding slot. Each ball guide 38 at its right-hand end 44 abuts the right-hand end panel, while its left-hand end 36 is spaced a distance from the left-hand panel greater than the ball diameter. As shown in FIG. 1, the wave-form track surface 28 and identical wave-form surface 40 are arranged in a complementary manner so that a path of uniform depth greater than the ball diameter is provided for the ball behind each slot 22. Similarly, each edge 30 of the track elements 26 is parallel to the underlying surface 42 of the ball guides 38 and is spaced a distance therefrom somewhat greater than the ball diameter.

The lowermost track element 26a has a horizontal lower edge 48 rather than a diagonally sloping lower edge since the ball does not pass therebeneath. Similarly, the uppermost ball guide 38a is characterized by a horizontal upper surface 49 instead of a sloping surface.

Means are provided in the preferred embodiment of the invention for simultaneously releasing the balls 24 into the respective ball track means of each of the panels 18 and 20. The ball release means includes vertically disposed tubular ball receptacles 50 and 52 which are respectively mounted within bores 54 and 56 passing through the top member 16. The bore receptacle 50 is positioned over the left-hand end of the uppermost track element 26 of the panel 18, while the receptacle 52 is disposed in the corresponding position with respect to the panel 20. A ball release lever 58 is pivotally mounted beneath the top member 16 by a central pivot screw 60. The outer ends 58a and 58b of the lever 58 respectively extend beneath the ball receptacles 50 and 52 to hold the balls in the ball receptacles when the lever is in the normal ball retaining position shown in FIGS. 1 and 2. A spring 62 affixed by suitable mounting means 64 to the top member 16 biases the lever 58 into the ball retaining position.

A ball release control assembly 66 comprises a plunger 68 which is upwardly springloaded into the normal raised position shown by spring 70. A conical portion 72 of the plunger 68 is adapted to engage a side edge of the lever 58 to pivotally move the lever against the force of the spring 62 when the plunger is depressed. This pivotal movement of the lever 58 will simultaneously release the balls 24 from the ball receptacles 50 and 52 as the ends 58a and 58b of the lever are pivoted from beneath the receptacles. Lever guides 74 and 76 mounted beneath the top member 16 limit the pivotal movement of the lever 58.

A ball discharge means 78 is provided at the right-hand lower corner of each of the panels 18 and 20 from which the balls may be removed upon completion of the exercise. Each ball discharge means as shown most clearly in FIGS. 1 and 4 comprises a downwardly extending chute 78 having a square hollow cross-section. The chute at its inner end adjoins the right-hand end of the ball track element 26a so that the ball will enter the chute after it has been advanced by the student along the full length of the lowermost slot 22. The chute is cut away at 80 along its sides and top to permit removal of the ball. A filler block 82 having a curved ball retaining inner surface 84 is positioned in the chute to stop the ball movement and hold the ball in the chute adjacent the removal opening. The ball upon discharge will remain in the discharge chute against the block surface 84 until it is manually removed.

The operation of the device, which is evident from the foregoing description, is as follows. With the two balls 24 placed in the ball receptacles 50 and 52 and with two students each facing one of the opposed panels 18 and 20, the plunger 68 is depressed to simultaneously release the balls into the respective ball tracks of the panels 18 and 20. Upon depressing of the plunger 68, one of the balls 24 will become visible to each student at the left-hand end of the uppermost slot 22 of his panel. The student will then insert a finger into the slot behind the ball and advance the ball along the wave-form track surface to the right-hand end of the slot, whereupon the ball will drop from sight and will roll unseen along the surface 42 of the hidden ball guide 38. The ball will then reappear to the student at the left-hand end of the succeeding slot whereupon the student's finger is again inserted behind the ball to again advance the ball to the right until it drops from sight. This rightward movement of the ball is repeated for each slot until the ball drops into the discharge means 78 at the right-hand end of the lowermost slot. The student whose ball first reaches the discharge means has "won" the exercise. The balls are then manually returned from the discharge means back to the ball receptacles. Since the spring 62 urges the lever 58 into the ball retaining position, the balls when placed in the ball receptacles will remain there until the plunger 68 is again actuated.

Although in the embodiment illustrated a device is shown for use by two students, it will be obvious that either side of the device may be used by a single student whether or not the opposite side is in use. Furthermore, it will be evident that the device could be made with only a single panel and the ball release means could be eliminated, the ball dropping directly from the ball receptacle onto the ball track at the left side of the uppermost panel slot. As an alternate arrangement, a pair of panels could be arranged side by side so that if the device were used as a form of contest, the student could visually observe the progress of the competing student.

FIG. 7 illustrates the optional application of indicia such as words, sentences and letters which are shown applied to the slotted panel above the slots. As the student's hand moves to the right along each slot, the student will associate the hand movement with the correct succession of letters and words. This may be either a subconscious learning process, or the hand movements may be slowed to the point where the movement of the hand corresponds to the reading of the letters and words encountered along the slot. Since the hand movement of the student in actuating the ball will always be toward the right, and since the passage of the ball back to the left is completely hidden from the student's view, the present device is a substantial advance in the field of remedial reading teaching aids.

Additionally, the interest of the student is maintained by the cause and effect involved in the ball release and the hidden ball return arrangement. A certain operational mystery is provided by the ball release mechanism and the younger student will be intrigued by the disappearance of the ball at the end of each slot and its subsequent reappearance at the beginning of the next slot. Since the ball is captive behind the slots and can only be removed by completing the exercise, there is a sufficient incentive to continue the exercise until the ball can be picked up at the ball discharge means.

In the preferred form of the device illustrated, the ball track means includes a wave-form track surface 28 along which the ball is advanced by the student. It would of course be possible to use a flat track surface but it is believed that there would be a tendency on the part of the student to flick the ball from the left-hand end to the right-hand end of the slot rather than move the hand the full length of the slot to advance the ball. With the wave-form track surface, the ball cannot be flicked and a full hand movement is required.

Other arrangements for impeding the rolling motion of the ball may also be used. In FIG. 5, a modified form of the track element designated 26' is illustrated. In this modified form, a series of spaced staples 86 are driven into the otherwise flat upper track element surface 28' to prevent a rolling movement of the ball along the track surface. In a unit made out of plastic or other moldable material, these staples could be replaced by a series of molded ridges having the same dimensions as the exposed part of the staples 86 in FIG. 5.

Another arrangement for restricting rolling movement of the ball is illustrated in FIG. 6. In this embodiment, the ball track element 26'' is characterized by a flat track surface 28''. The bottom surface of the vertically spaced ball guide 38a'' is also flat and a waveform spring element 88 is attached thereto to bear against the ball during travel along the track surface 28''. The spring element 88 will prevent a rolling movement of the ball, requiring the student's constant finger pressure to advance the ball along the full length of the track.

Other arrangements could be adapted for restraining the ball movement. For example, if the ball were of a ferrous metal, a series of spaced permanent magnets embedded in the top, bottom or side of the ball track would require the continuous application of finger pressure to advance the ball the length of the track.

Another arrangement for creating the same result would be the use of a member running above the ball track, the weight of which would rest on the ball during ball travel along the track. The bottom of the member could be irregular, for example a wave contour similar to that shown in the preferred embodiment.

The use of the wave-form track, the wave-form spring, or the spaced staples all produce a pulsing sensation to the student as the ball is advanced along the track. This is desirable since it adds a feeling of life and excitement to the ball movement and instills a psychological sense of progress to the student as the exercise progresses. In addition, since a printed line consists of a series of discrete letters, spaces or marks, the waveform track will produce tactile sensations commensurate with the progress made in reading the associated line of printed material.

Manifestly, other changes in details and construction can be effected by those skilled in the art without departing from the spirit and scope of the invention.

We claim:

1. A reading accelerator comprising a substantially vertical panel having a plurality of vertically spaced horizontal slots therein, a ball having a diameter greater than the width of each said slot, ball track means behind each said slot extending the horizontal length of the slot, said track means being adapted to guide said ball along each said slot in response to finger pressure thereon applied through said slot, said track means including means for delivering said ball under gravity force from the right-hand end of one slot to the left-hand end of the slot below, means for introducing said ball into said track means adjacent the left-hand end of the uppermost of said slots, and means permitting removal of said ball from said track means adjacent the right-hand end of the lowermost of said slots.

2. The invention as claimed in claim 1 including means for impeding the rolling movement of said ball along the portions of said track means behind said slots.

3. The invention as claimed in claim 2 wherein said means for impeding the rolling movement of said ball comprises a wave-form configuration of said track means.

4. The invention as claimed in claim 2 wherein said means for impeding the rolling movement of said ball comprises a plurality of friction inducing elements spaced at intervals along said track means.

5. The invention as claimed in claim 4 wherein said friction inducing elements comprise staples in the ball supporting surface of said track.

6. The invention as claimed in claim 2 wherein said means for impeding the rolling movement of said ball comprises a spring element adapted to bear continuously against said ball as it is moved along said slot.

7. The invention as claimed in claim 6 wherein said spring element has a wave-form configuration.

8. The invention as claimed in claim 1 including indicia printed on said panel along said slots to be read as said ball is moved along said slots.

9. A reading accelerator comprising a pair of substantially vertically disposed panels, each of said panels having a plurality of vertically spaced horizontal slots therein, a ball for each said panel having a diameter greater than the width of each said slot, ball track means behind each said slot extending the horizontal length of the slot, said track means being adapted to guide the ball along each said slot in response to finger pressure thereon applied through said slot, said track means including means for delivering said ball under gravity force from the right-hand end of one slot to the left-hand end of the slot below, means for simultaneously introducing one of said balls into each said panel track means adjacent the left-hand end of the uppermost of the panel slots, and means permitting removal of said balls from said track means adjacent the right-hand end of the lowermost of said slot.

10. The invention claimed in claim 9 including means for impeding the rolling movement of said ball along the portions of said track means behind said slots.

11. The invention as claimed in claim 10 wherein said means for impeding the rolling movement of said ball comprises a wave-form configuration of said track means.

* * * * *